May 5, 1970 C. A. BOENKE 3,510,776

FM TONE SIGNAL RECEIVING CIRCUIT

Filed Feb. 16, 1966

INVENTOR.
Clyde A. Boenke

BY
Mueller, Aichele & Rauner

ATTY'S.

United States Patent Office 3,510,776
Patented May 5, 1970

3,510,776
FM TONE SIGNAL RECEIVING CIRCUIT
Clyde A. Boenke, Lombard, Ill., assignor to Motorola, Inc., Franklin Park, Ill., a corporation of Illinois
Filed Feb. 16, 1966, Ser. No. 527,660
Int. Cl. H04b 5/04
U.S. Cl. 325—55 6 Claims

ABSTRACT OF THE DISCLOSURE

An FM tone responsive receiving circuit includes a superheterodyne FM tone receiver which operates with a zero intermediate frequency amplifier, the output of which is supplied to a pulse count discriminator having an output filter in the form of a tone responsive reed filter, the resonant frequency of which is the second harmonic of the modulation signal of the transmitted carrier wave.

The present invention relates generally to tone signaling systems, and more particularly to a superheterodyne FM tone receiver which operates with a zero intermediate frequency.

Several prior art receivers utilize a mixing process which results in an output centered at zero frequency. The homodyne AM receiver and certain coherent detection systems operate in this manner. These receivers do not have an intermediate frequency as such, since the output of the mixing process gives the demodulated information directly. However, these systems require phase coherency between the local oscillator signal and the incoming carrier wave, and, further, are not suitable for reception of FM.

The FM receiver according to the present invention does not require phase coherency between the incoming carrier and the local oscillator signals, and this receiver may be constructetd using fewer and less complex components than those required in a standard superhetetrodyne FM receiver.

An object of the present invention is to provide an improved superheterodyne FM receiver particularly adapted for the reception of tone coded signals.

Another object of the invention is to provide an improved superheterodyne FM receiver, the selectivity of which is not dependent upon complex frequency selective circuits.

A further object of the invention is to provide an improved superheterodyne FM receiver constructed of well known electronic circuit components in a novel circuit arrangement which does not require the critical high frequency circuits and alignment features of presently known superheterodyne receivers.

Figure 1:
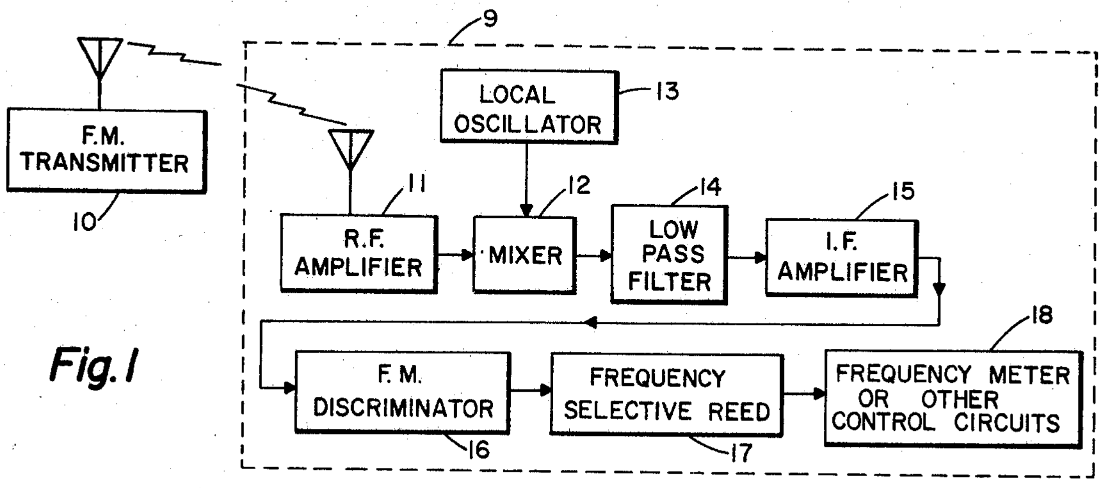
Figure 3:
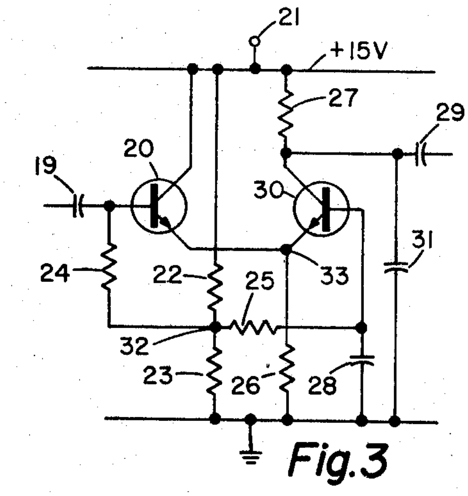
Figures 2A, 2B:
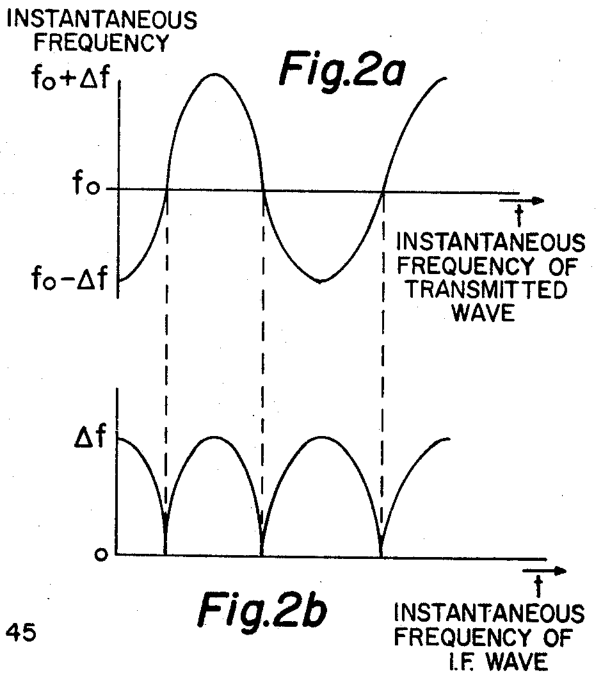
Figure 4:
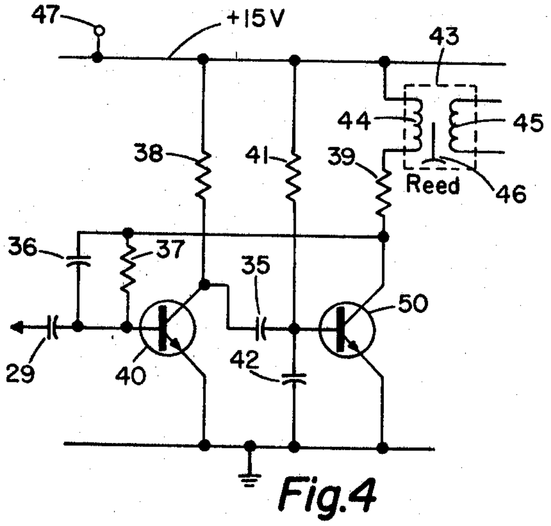

The invention to be described is illustrated in the accompanying drawings wherein:

FIG. 1 is a functional block diagram of the FM receiver according to the present invention;

FIGS. 2*a* and 2*b* are waveform diagrams illustrating the relationship between the frequency of the incoming carrier wave and the frequency of the IF signal;

FIG. 3 is a schematic diagram of an emitter coupled IF amplifier used to amplify the IF signal; and FIG. 4 is a schematic diagram of an FM pulse count discriminator which is particularly suited for operation in the receiver according to the invention.

Briefly, described, the present invention includes a means and method for tone signaling in which the frequency of a carrier wave is modulated by a signal which is harmonically related to a preselected frequency at which a frequency selective reed resonates. The modulated carrier is then transmitted to the vicinity of a person to be alerted or equipment to be controlled by a tone at the preselected frequency, and the carrier is mixed with a local oscillator signal equal in frequency to the frequency of the carrier, thereby producing a zero intermediate difference frequency signal. The zero IF signal is thereafter demodulated to produce a baseband (tone) signal having the preselected frequency mentioned above, and the presence of this signal is sensed by the frequency selective reed to alert a person called or to energize approriate control circuits.

Referring in detail to the drawing, there is shown in FIG. 1 an FM transmitter 10 at which the coded FM carrier orginates and an FM receiver 9 consisting of a minimum number of standard electronic components. The receiver 9 includes an RF amplifier 11 connected to an input antenna and a mixer 12 in which the amplifier carrier from the output of the RF amplifier 11 and a locally generated signal from oscillator 13 are mixed to produce a zero difference frequency IF signal at the input to a low pass filter 14. The low pass filter 14 is tuned to pass the difference frequency IF signal and couples the zero IF signal to the input of the amplifier 15. The amplified IF signal is applied to the input of an FM discriminator 16 wherein the tone coded information is recovered. This tone coded information is coupled to the input of a frequency selective device 17 such as a resonant reed or the like which resonates at a preselected frequency. The frequency selective device 17 may be coupled to a frequency meter or other control circuits 18 which can be used to energize alerting means necessary to attract the attention of a person called, to transfer coded information to a person called, or to energize electrical circuits for control purposes.

The waveform diagram in FIG. 2*a* shows the variation in the instantaneous frequency of the transmitted carrier from a frequency of $f_0+\Delta f$ to a frequency of $f_0-\Delta f$, where $f_0$ is the frequency of the carrier wave (and the frequency of the local oscillator signal) and $\Delta f$ is the maximum change in the transmitter frequency. The waveform diagram in FIG. 2*b* shows the instantaneous frequency of the IF wave only in positive frequency variations from 0 to $\Delta f$. The pulse count discriminator 16 which is described in more detail below with reference to FIG. 4 discriminates the instanteous frequency of the IF wave down to zero and then begins to rise again, exhibiting a characteristic V-shaped discriminator curve. Since the frequency discriminator 16 output signal will contain primarily the second harmonic of the modulation signal due to the IF frequency variations shown in FIG. 2*b*, the frequency of the modulation tone at the transmitter 10 should be set at one-half of the preselected frequency to which the frequency selective device 17 is sensitive.

The emitter-coupled IF amplifier stage which is schematically illustrated in FIG. 3 and which is functionally represented by block 15 in the diagram of FIG. 1 includes a pair of emitter-coupled transistors 20 and 30 which amplify the zero IF signal prior to being coupled to the input of the discriminator 16. The emitter-coupled IF stage includes input and output coupling capacitors 19 and 29 and voltage divider resistors 22 and 23 connected between the point 21 of positive potential and ground. The base bias resistors 24 and 25 for transistors 20 and 30 are connected between the respective bases of the emitter-coupled transistors and to a center tap 32 intermediate the voltage divider resistors 22 and 23. A common emitter-resistor 26 is connected between the emitters of transistors 20 and 30 and ground, and a load resistor 27 is connected between the collector of the output NPN transistor 30 and the point 21 of positive potential. A bypass capacitor 28 is connected between the base electrode of output transistor 30 and ground to prevent signal voltage from appearing at this point, and another bypass capacitor 31 is connected between the collector electrode of the output transistor 30 and ground to control the high frequency limit of amplification.

The emitter-base voltage drop of transistor 20 is matched to that of transistor 30, and the voltage at the emitters of transistors 20 and 30 is controlled by the amplitude of the incoming IF signal at the base of transistor 20. This voltage variation at the emitters of transistors 20 and 30 is reflected in the amplitude of the voltage developed across load resistor 27 and coupled through the output capacitor 29 either to the input of a further IF amplifier stage (not shown) or coupled directly to the input of the pulse count discriminator shown in FIG. 4.

The particular emitter-coupled amplifier stage in FIG. 3 was chosen for operation with the receiver circuitry of FIG. 1 since this amplifier must be coupled down to low frequencies, which causes the recovery time constant for overloading conditions of the amplifier to be fairly long. The IF amplifier stage of FIG. 3 is inherently resistant to overloading, thereby making it especially suited for use in the receiver circuit according to the invention.

The pulse count discriminator shown in FIG. 4 is a monostable multivibrator including a pair of switching transistors 40 and 50 which are capacitance coupled collector-to-base via coupling capacitor 35. The multivibrator further includes a feedback network 34 connected from the collector of transistor 50 to the base of transistor 40. This feedback network includes capacitor 36 and resistor 37 necessary to provide monostable switching action to be described. Each transistor 40 and 50 has a load resistor 38 and 39 connected thereto and a base-bias resistor 41 is connected between a point 47 of positive potential and the base electrode of transistor 50. Still another capacitor 42 is connected between the base electrode of transistor 50 and ground, and the addition of this capacitor prevents the emitter to base voltage of transistor 50 from reaching the breakdown potential.

The frequency selective device 17 is connected in the collector circuit of transistor 50 and includes input and output coils 44 and 45 and a resonant reed 46 connected therebetween.

Under quiescent conditions, transistor 50 is normally conducting and transistor 40 is normally non-conducting. When a positive pulse is applied to the base of transistor 40, its collector voltage begins to fall, and this transition at the collector of transistor 40 is coupled to the base of transistor 50, tending to turn transistor 50 off. As the conduction in transistor 50 decreases, the voltage at the collector of transistor 50 rises and this positive transition is coupled through feedback capacitor 36 and resistor 37 to the base of transistor 40, tending to drive transistor 40 on harder. This regenerative action continues until transistor 40 is driven into full conduction and transistor 50 is cut off. However, soon after the cessation of an input signal to the base of transistor 40, the capacitors 35 and 42 discharge and transistor 50 is once again turned on. As transistor 50 begins to conduct, a negative voltage transition is now coupled from the collector of transistor 50 back to the base of transistor 40, tending to turn transistor 40 off.

Since the output of the pulse count discriminator 16 is primarily the second harmonic of the modulating signal frequency, due to the variation in instantaneous frequency with time as shown in FIG. 2*b*, the frequency selective device 17 should be tuned to the second harmonic of the modulating signal. With the resonant reed 46 tuned to a preselected frequency equal to the second harmonic of the modulating frequency, an output signal may be derived from the output coil of 45 and coupled to a frequency meter or other control circuits selected to alert a person called or to control other equipment.

The resonant reed 46 and associated inductive coils 44 and 45 which form the frequency selected device 17 are extremely useful for the circuit arrangement shown in FIG. 4. This resonant reed 46 vibrates strongly when the signal at the inductive coil 44 is at the resonant frequency of the reed. This strong vibration increases the inductive coupling between input and output coils 44 and 45 during the reception of tone coded signals at a frequency equal to approximately half that of the resonant frequency of the reed.

Since the amount of IF power appearing at the resonant reed input coil 44 is somewhat larger than the detected noise, the sensitivity of the receiver will be limited. However, this condition can be minimized by using a pulse count discriminator (not shown) which is triggered on both positive and negative zero crossings of the IF wave.

The signaling efficiency of the receiver according to the invention is below that of similar conventional systems operating in the same bandwidth. This reduction in signaling efficiency is due to (1) the fact that the RMS value of the second harmonic term of the output voltage is approximately 8 db below that of the fundamental modulation from which it was derived and (2) the fact that the IF signal sweeps through the reed frequency during modulation, thereby causing some of the IF power to appear in the reed passband. For these reasons some of the signal energy is lost during signal reception by the receiver. However, this disadvantage in the reduction in signal efficiency caused by the above described zero IF operation is far outweighed by the advantages of the simplicity of the circuit and its particular adaptability to use for tone signaling where phase coherency between an incoming carrier and local oscillator signals is not required.

The following is a table of component values for the schematic diagrams of FIGS. 3 and 4.

TABLE

Transistors 20, 30, 40 and 50—NPN
Voltage at terminal 21—+15 volts
Resistors:
- 22—8.2 kilohms
- 23—2.2 kilohms
- 24—3.3 kilohms
- 25—3.3 kilohms
- 26—390 ohms
- 27—2.2 kilohms Capacitors:
- 28—2 microfarads
- 29—.22 microfarad
- 31—.01 microfarad Voltage at terminal 47—+15 volts
Capacitors:
- 35—.003 microfarad
- 36—11 picofarads Resistors:
- 37—10 kilohms
- 38—1.8 kilohms
- 39—1.2 kilohms
- 41—27 kilohms Capacitor 42—.01 microfarad However, the above exemplary values should not be construed as limiting the scope of the present invention.

I claim:

1. A system for tone signaling including in combination:
   (a) means for modulating the frequency of a carrier wave with a modulating signal,
   (b) means coupled to said modulating means for transmitting the frequency modulated carrier wave to the vicinity of a person to be alerted or equipment to be controlled by said tone having said preselected frequency,
   (c) means for receiving a carrier wave, the frequency of which has been modulated with a signal harmonically related to said preselected frequency,
   (d) means coupled to said receiving means for mixing said carrier wave with a non-phase-coherent locally generated signal having a frequency equal to that of said carrier wave, thereby producing an intermediate difference frequency signal centered about zero frequency, (e) low-pass filter means coupled to said mixing means for filtering said zero intermediate frequency signal from said mixing means, (f) means coupled to said filtering means for demodulating said zero intermediate frequency signal, and (g) means coupled to said demodulating means for detecting the presence of a tone signal at a frequency which is a predetermined harmonic of the modulating signal,

2. A method of tone signaling which comprises the steps of:

(a) modulating the frequency of a carrier wave with a modulating signal which is harmonically related to a preselected tone frequency to be detected, (b) transmitting the frequency modulated carrier wave to the vicinity of a person to be alerted by said tone having said preselected frequency, (c) receiving said frequency modulated carrier wave, (d) mixing said frequency modulated carrier wave with a non-phase-coherent local oscillator signal having a frequency equal to the frequency of said carrier wave thereby producing a zero intermediate difference frequency signal in the mixing process, (e) filtering said zero intermediate difference frequency signal obtained in said mixing process, (f) demodulating said zero intermediate frequency signal to produce a tone signal having said preselected frequency, and (g) detecting the presence of said tone signal having said preselected frequency to provide an alerting signal or to control other electrical equipment.

3. Superheterodyne receiving equipment for use in tone signaling including in combination:

(a) means for receiving a carrier wave, the frequency of which has been modulated with a signal harmonically related to the preselected frequency, (b) means coupled to said receiving means for mixing said carrier wave with a non-phase-coherent locally generated signal having a frequency equal to that of said carrier wave thereby producing a zero intermediate difference frequency signal, (c) low-pass filter means coupled to said mixing means for filtering said zero intermediate frequency signal from said mixing means, (d) means coupled to said filtering means for demodulating said zero intermediate frequency signal, (e) means coupled to said demodulating means for sensing the presence of a tone signal at said preselected frequency.

4. The receiving equipment according to claim 3 wherein said demodulating means includes a monostable multivibrator connected as a pulse count discriminator, said monostable multivibrator connected to receive said zero intermediate frequency signal for producing an output signal proportionate to instantaneous frequency of said intermediate difference frequency signal.

5. The receiving equipment according to claim 4 wherein the sensing means includes a frequency selective resonant reed tuned to said preselected frequency, with the sensing means being coupled directly to the output of the monostable multivibrator.

6. The combination according to claim 5 wherein the resonant frequency of the frequency selective reed is at the second harmonic of the modulating signal, wherein the monostable multivibrator includes a pair of transistors cross-coupled for monostable switching action during the application of signals from the IF amplifier stage to one transistor in the pair, and wherein the frequency selective resonant reed circuit of the sensing means is coupled to the other transistor of the pair of cross-coupled transistors in the monostable multivibrator.

References Cited

UNITED STATES PATENTS

| | | | |
|---|---|---|---|
| 2,159,493 | 5/1939 | Wright | 325—444 |
| 2,171,678 | 9/1939 | Weyers | 325—444 |
| 2,770,727 | 11/1956 | Hupert et al. | 325—349 XR |
| 2,899,547 | 8/1959 | Crow et al. | 325—45 XR |
| 3,138,755 | 6/1964 | Kompelien | 325—55 XR |
| 3,351,864 | 11/1967 | Scribner | 329—126 |
| 3,426,151 | 2/1969 | Tygart | 325—349 XR |

ROBERT L. GRIFFIN, Primary Examiner

R. S. BELL, Assistant Examiner

U.S. Cl. X.R.

325—32, 45, 349; 329—126; 340—311